United States Patent
Franzaroli

(10) Patent No.: US 10,329,097 B2
(45) Date of Patent: Jun. 25, 2019

(54) CONVEYOR FOR TRANSPORTING A PRODUCT

(71) Applicant: PULSAR S.R.L., Castel Maggiore (Bologna) (IT)

(72) Inventor: Massimo Franzaroli, Castel Maggiore (IT)

(73) Assignee: PULSAR S.R.L., Castel Maggiore (IT)

( * ) Notice: Subject to any disclaimer, the term of this patent is extended or adjusted under 35 U.S.C. 154(b) by 0 days.

(21) Appl. No.: 15/736,254

(22) PCT Filed: Jun. 15, 2016

(86) PCT No.: PCT/IB2016/053535
§ 371 (c)(1),
(2) Date: Dec. 13, 2017

(87) PCT Pub. No.: WO2016/203393
PCT Pub. Date: Dec. 22, 2016

(65) Prior Publication Data
US 2018/0178985 A1 Jun. 28, 2018

(30) Foreign Application Priority Data
Jun. 19, 2015 (IT) .................. 202015000025723

(51) Int. Cl.
*B65G 17/06* (2006.01)
*B65G 23/16* (2006.01)
(Continued)

(52) U.S. Cl.
CPC ............ *B65G 23/16* (2013.01); *B21B 1/16* (2013.01); *B65G 17/08* (2013.01); *B65G 17/40* (2013.01);
(Continued)

(58) Field of Classification Search
None
See application file for complete search history.

(56) References Cited

U.S. PATENT DOCUMENTS 3,033,353 A 5/1962 Burnett
5,303,817 A 4/1994 Kissee
(Continued)

FOREIGN PATENT DOCUMENTS

CH 708428 A1 2/2015
EP 2346756 A1 7/2011
(Continued)

OTHER PUBLICATIONS

International Search Report dated Feb. 13, 2017 from counterpart PCT App PCT/IB2016/053535.
(Continued)

*Primary Examiner* — Kavel Singh
(74) *Attorney, Agent, or Firm* — Shuttleworth & Ingersoll, PLC; Timothy Klima

(57) ABSTRACT

A conveyor for transporting a product, the product being preferably in the form of respective articles, in particular articles of the tissue industry, including a means for supporting and guiding an endless conveyor belt, especially one of the type with articulated links, the belt including at least one respective positive stretch, in particular for transporting the product, and preferably a return stretch, if necessary positioned under the respective longitudinal transporting stretch; and means for driving the conveyor belt and including a means for engaging the respective link of the conveyor belt and, more specifically, means which are adapted to engage a rear-facing surface of the respective conveyor belt link, the means for engaging and driving the conveyor belt being adapted to engage a respective longitudinal stretch, preferably rectilinear, of the conveyor belt itself.

20 Claims, 7 Drawing Sheets

(51) Int. Cl.
*B65G 17/08* (2006.01)
*B65G 17/40* (2006.01)
*B21B 1/16* (2006.01)
*B65G 23/06* (2006.01)

(52) U.S. Cl.
CPC .......... *B21B 2261/10* (2013.01); *B65G 23/06* (2013.01); *B65G 2201/02* (2013.01); *B65G 2812/02287* (2013.01); *B65G 2812/02366* (2013.01)

(56) References Cited

U.S. PATENT DOCUMENTS 7,926,641 B2 * 4/2011 Gonzalez Alemany .................... B66B 23/028 198/330
2011/0073444 A1 3/2011 Wunsch

FOREIGN PATENT DOCUMENTS

| EP | 2586729 A1 | 5/2013 |
| GB | 2053124 A | 2/1981 |
| JP | S5948319 A | 3/1984 |
| WO | WO2008070444 A2 | 6/2008 |
| WO | WO2012001538 A2 | 1/2012 |

OTHER PUBLICATIONS

Written Opinion of International Preliminary Examing Authority dated Jul. 25, 2017 from counterpart PCT/IB2016/053535.

* cited by examiner

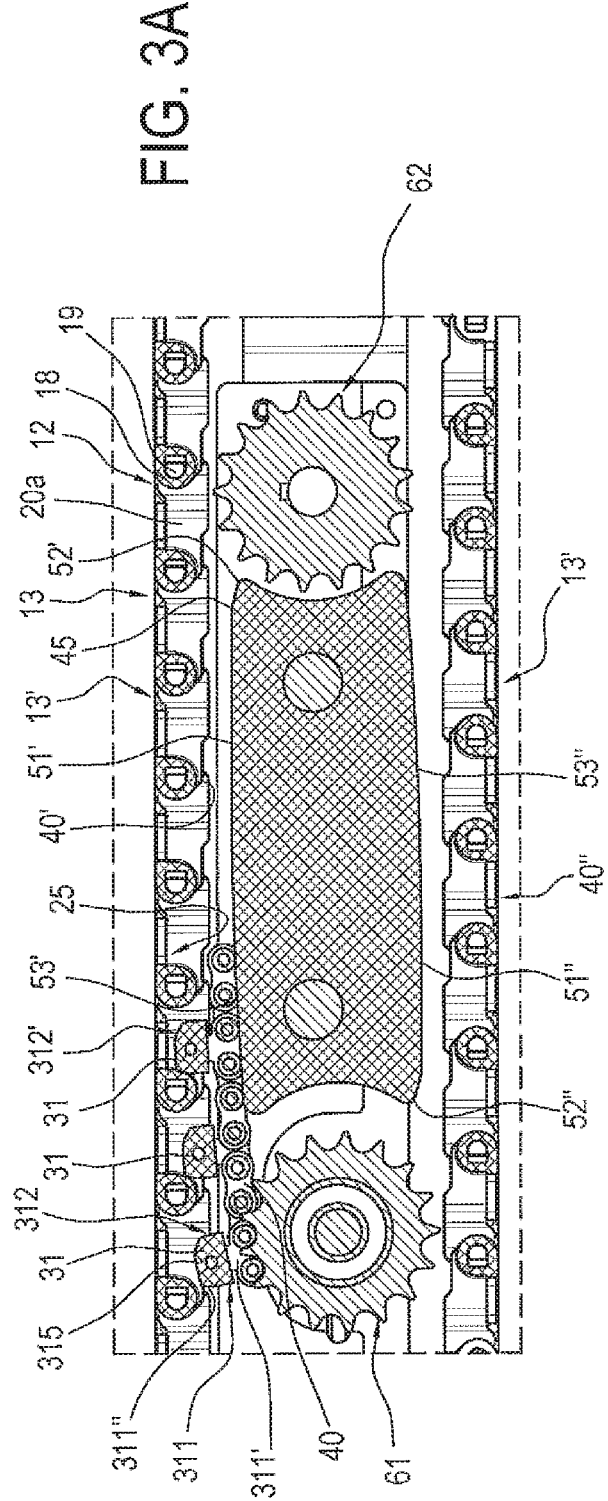
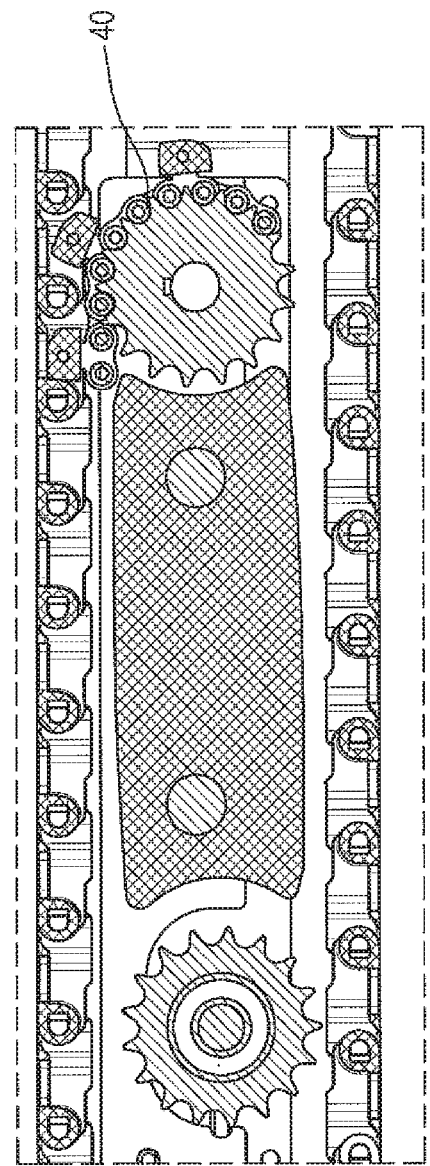
FIG. 3A
FIG. 3B

CONVEYOR FOR TRANSPORTING A PRODUCT

TECHNICAL FIELD

This invention relates to a conveyor for transporting a product.

This application is the National Phase of International Application PCT/IB2016/053535 filed Jun. 15, 2016 which designated the U.S. and that International Application was published under PCT Article 21(2) in English.

This application claims priority to Italian Application No. 202015000025723 filed Jun. 19, 2015, which application is incorporated by reference herein.

BACKGROUND ART

Known in the prior art are conveyors for transporting a product, in particular in the form of articles of the tissue industry. These conveyors comprise means for supporting and guiding an endless conveyor belt of the type with articulated links, and means for driving the conveyor belt comprising means for engaging the respective conveyor belt link and, more specifically, means which are adapted to engage a rear-facing surface of the respective conveyor belt link.

These articulated link conveyors of the prior art type comprise respective drive means which consist of a suitably power-driven drive wheel provided at one end of the conveyor belt constituting an inverting drive end where the conveyor belt changes its direction of motion, between an upper positive feed stretch with the products on it and a return stretch.

At the end opposite the drive end of the conveyor belt, an idle or driven wheel is provided where the conveyor belt simply changes its direction of motion, between the return stretch and the positive feed stretch with the products on it.

In prior art conveyors, therefore, since drive is provided by means of a wheel located at a respective end of the conveyor belt itself, the length of the conveyor belts is limited and it is not possible to make conveyor belts of desired length for lines which are particularly long. Thus, to convey the product for long distances, the conveying path must be divided into different zones, each served by a respective endless conveyor belt, between which respective transfer zones or tables are provided. These have the effect of hampering feed flow, by slowing or stopping the products and what is more, in such situations, creating the risk of damaging the products.

Whatever the case, a need which is felt in the industry is that of having conveyors which cover greater distances than those available up to now and/or which provide a particularly effective driving action, with the added advantage of savings in energy costs.

Moreover, the drive systems used in these conveyors necessarily involve making conveyor belts with an upper positive stretch and a lower negative stretch which reduces versatility of use and which requires abundant amounts of material to cover the return distances.

A need which is felt in the industry is that of having conveyor solutions which are particularly easy to implement and install and/or which are relatively inexpensive.

DISCLOSURE OF THE INVENTION

This invention therefore proposes a new solution as an alternative to the solutions known up to now and, more specifically, proposes to overcome one or more of the above mentioned drawbacks or problems and/or to meet one or more of the needs felt by the trade and which, in particular, may be inferred from the above.

It is accordingly provided a conveyor for transporting a product, preferably in the form of respective articles, in particular in the form of articles of the tissue industry, preferably made of paper or other material such as woven or non-woven fabric, these articles being preferably in the form of rolls, packages, in particular, packs or packets, or respective containers, particularly for toilet paper, kitchen paper, napkins, handkerchiefs, face wipes, hand towels, bed sheets and the like, or in the form of rolls of material for kitchen use such as aluminium foil, plastic wrap, greaseproof paper or the like, the conveyor comprising means for supporting and guiding an endless conveyor belt, especially one of the type with articulated links, the belt including at least one respective positive stretch, in particular for transporting the product, and preferably a return stretch, if necessary positioned under the respective longitudinal transporting stretch, and means for driving the conveyor belt comprising means for engaging the respective conveyor belt link and, more specifically, means which are adapted to engage a rear-facing surface of the respective conveyor belt link, characterized in that the means for engaging and driving the conveyor belt are adapted to engage a respective longitudinal stretch, preferably rectilinear, of the conveyor belt itself.

That way, it is possible to make means for driving the conveyor belt which can be located at any point on the respective longitudinal extension of the conveyor belt, if necessary at points which are at a certain longitudinal distance from each other, thus making it possible to make endless conveyor belts of desired length, in particular of particularly great length.

Moreover, it is no longer necessary for the conveyor belt to have an upper feed stretch and a lower return stretch since it is possible to make a conveyor belt which extends along a ring-shaped path consisting only of a positive or upper path of the conveyor belt, if necessary lying in the same plane. In practice, a drive system is obtained which improves the flexibility of use of the conveyor belts, in particular those of the type with articulated links.

BRIEF DESCRIPTION OF THE DRAWINGS

This and other innovative aspects, or specific advantageous embodiments, are set out in the appended claims and the technical features are apparent from the detailed description which follows of a preferred, advantageous embodiment which must, however, be considered purely as a non-limiting example of the invention, the description being made with reference to the accompanying drawings, in which:

FIGS. 3A and 3B are respective longitudinal cross sections of the preferred embodiment of the drive unit of the conveyor belt according to the invention;

DETAILED DESCRIPTION OF PREFERRED EMBODIMENTS OF THE INVENTION

Figure 1:
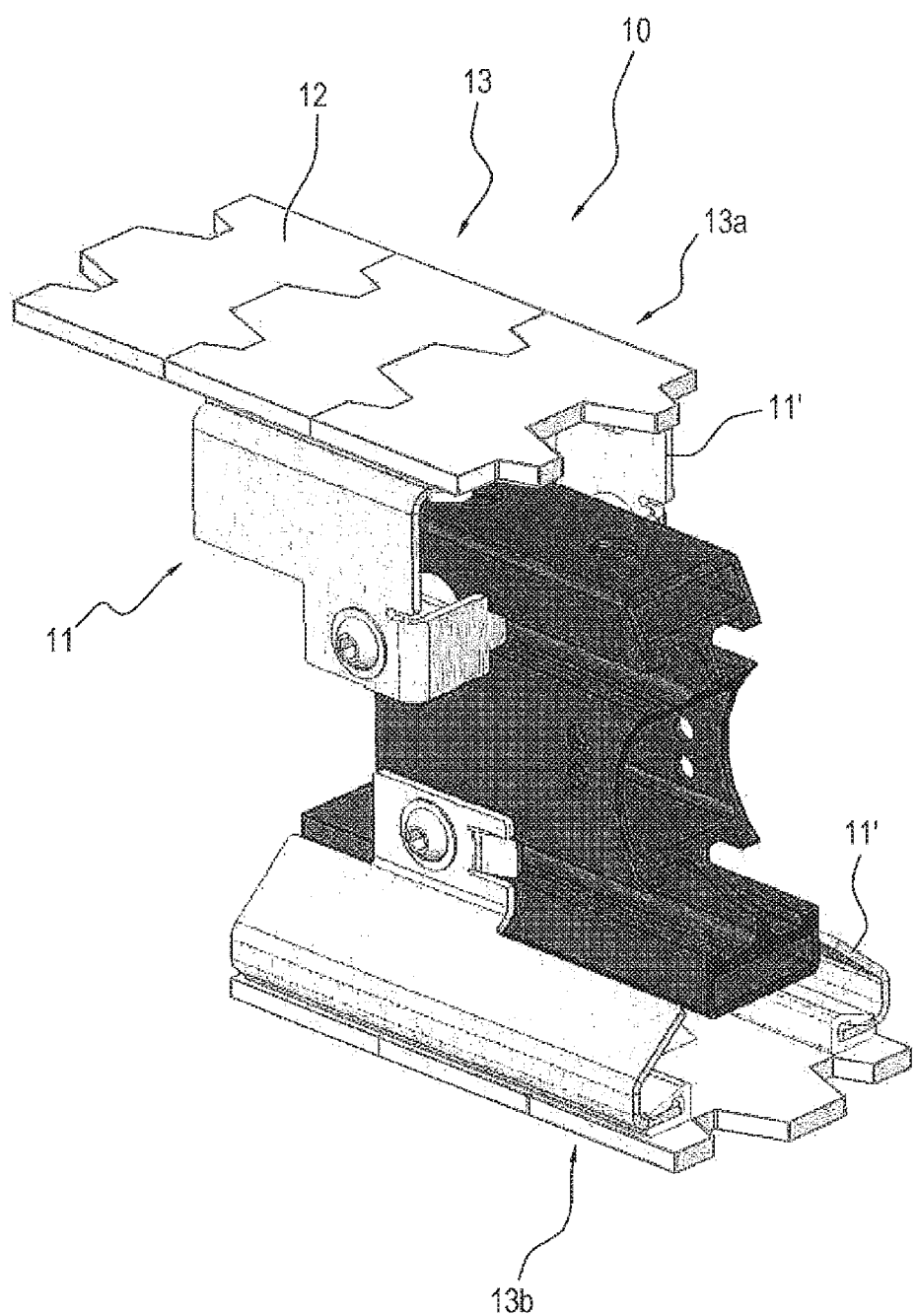
FIG. 1 is a perspective view of a portion of a preferred embodiment of a conveyor according to this invention.
Figure 2A:
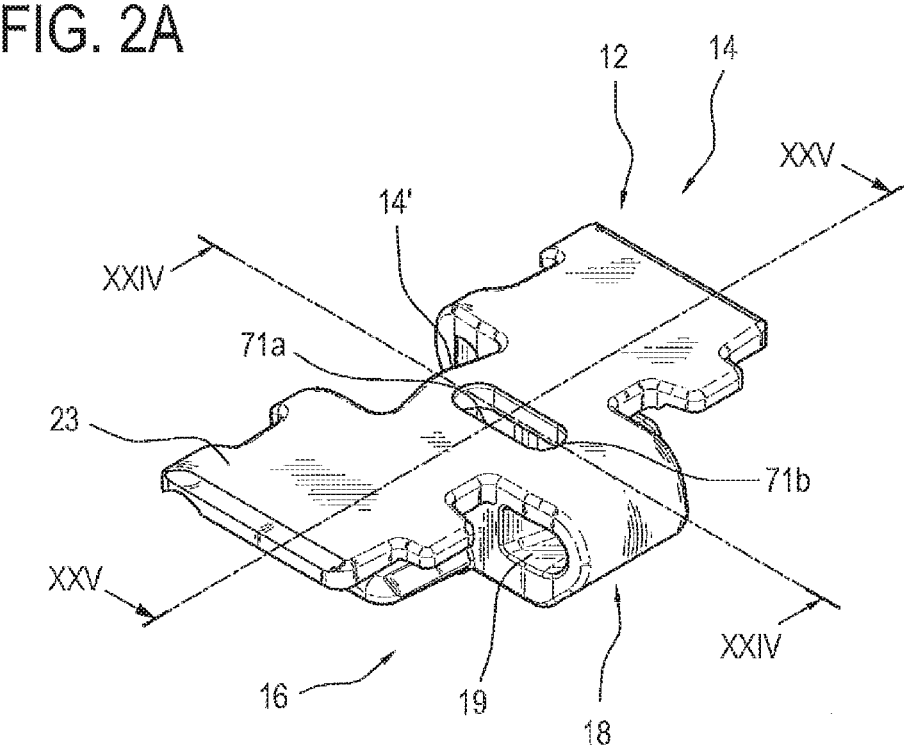
FIGS. 2A to 2E are, respectively, a perspective view, a top plan view, a bottom plan view, a longitudinal cross section through line XXIV-XXIV of FIG. 2A, and a transverse cross section through the line XXV-XXV of FIG. 2A, showing the preferred embodiment of the link used in the conveyor of this invention.
Figure 2B:
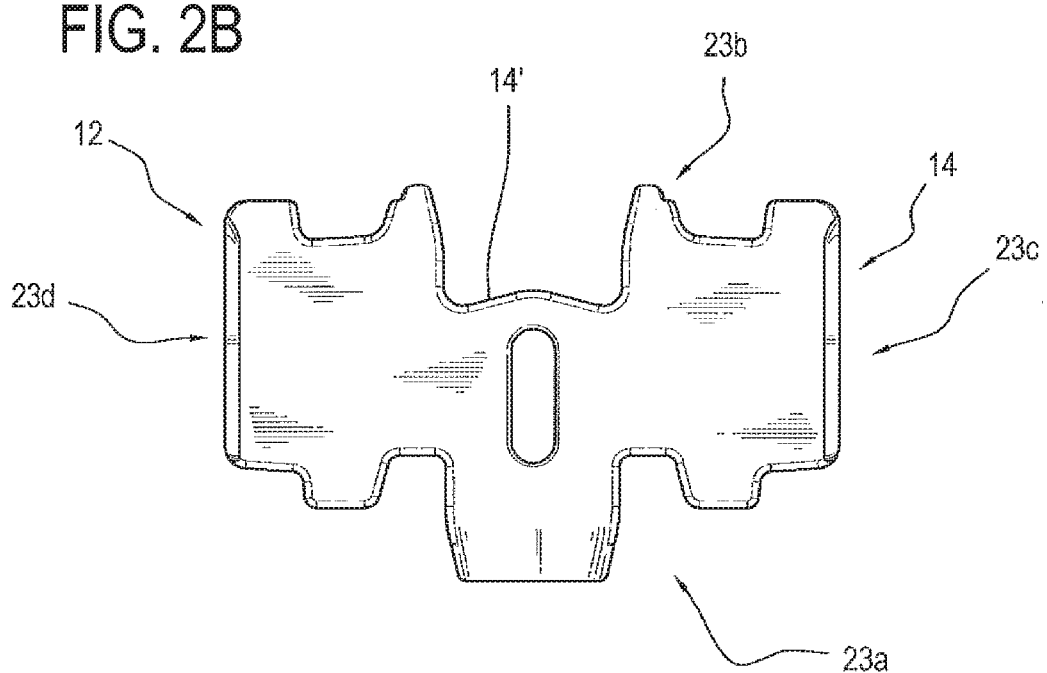
Figure 2C:
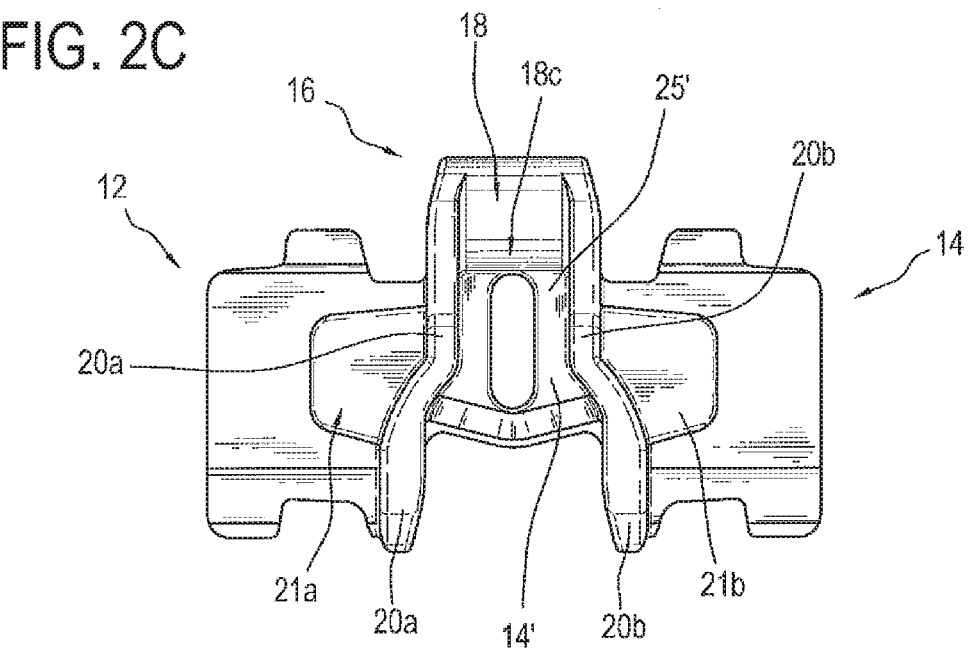
Figure 2D:
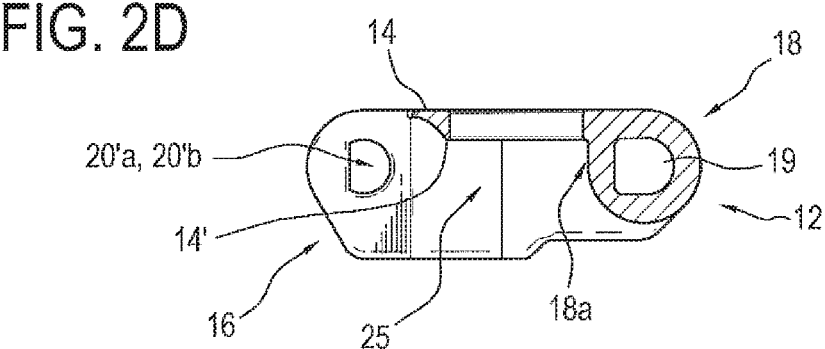
Figure 2E:
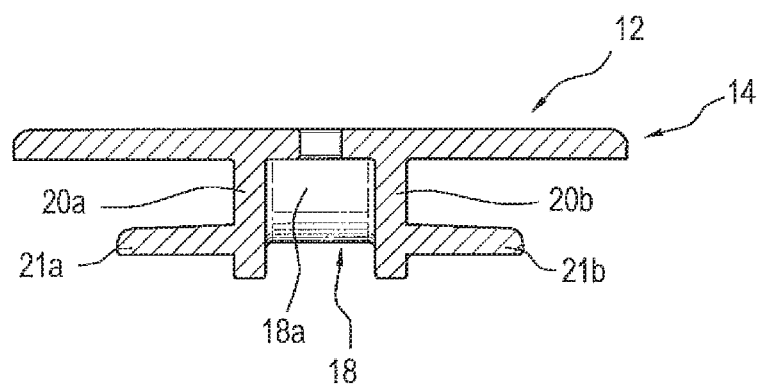
Figure 4A:
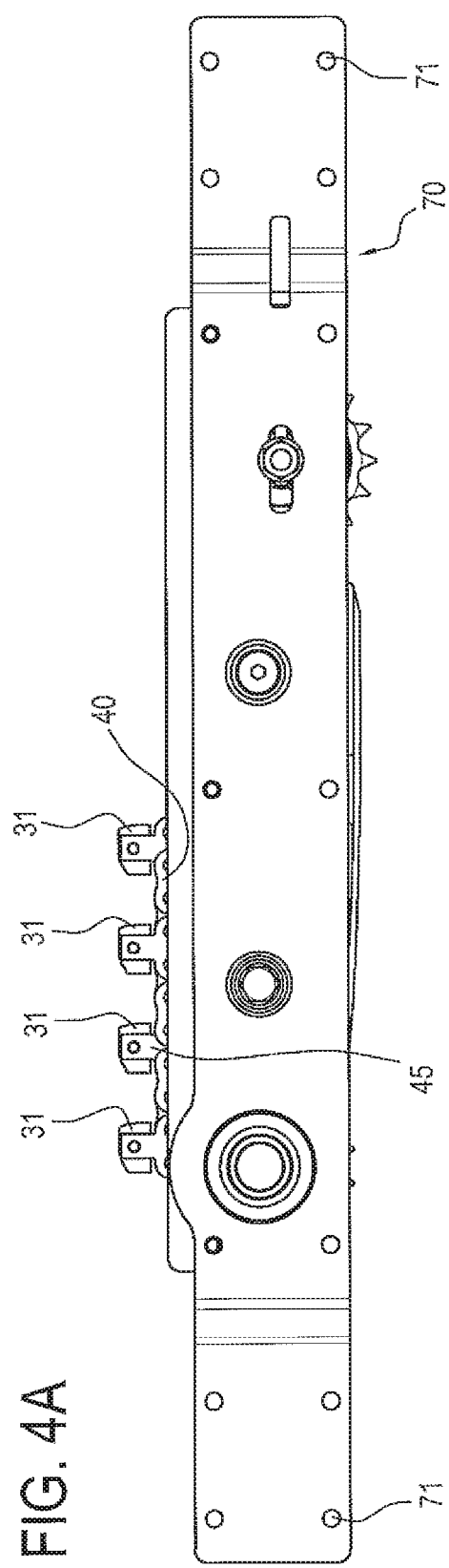
FIG. 4A is a side view of the preferred embodiment of a drive unit according to the invention.
Figure 4B:
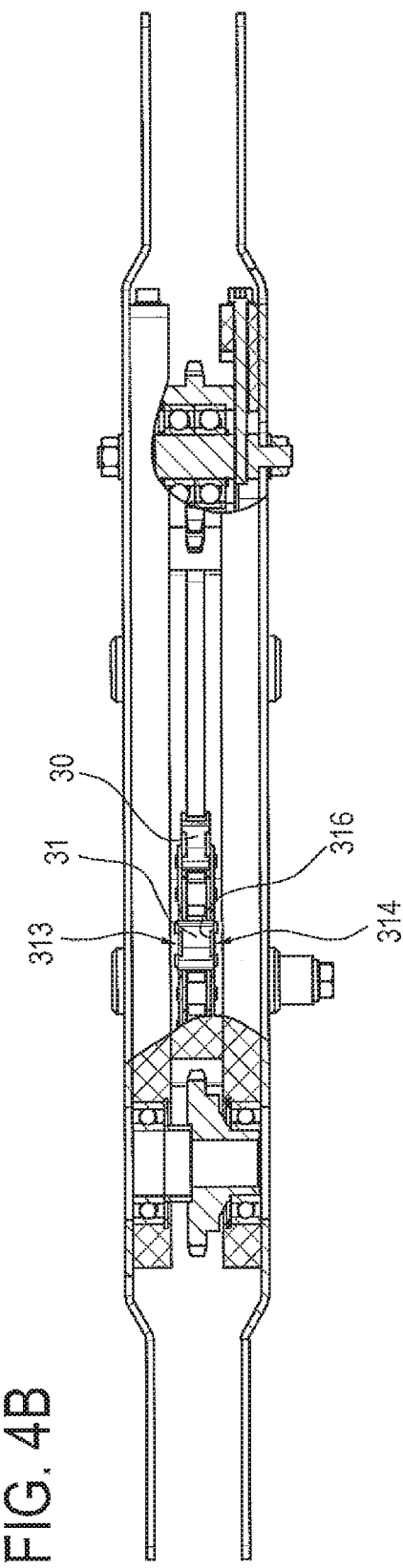
FIG. 4B is a top plan view, with some parts in cross section, of the preferred embodiment of a drive unit according to the invention.
Figure 4C:
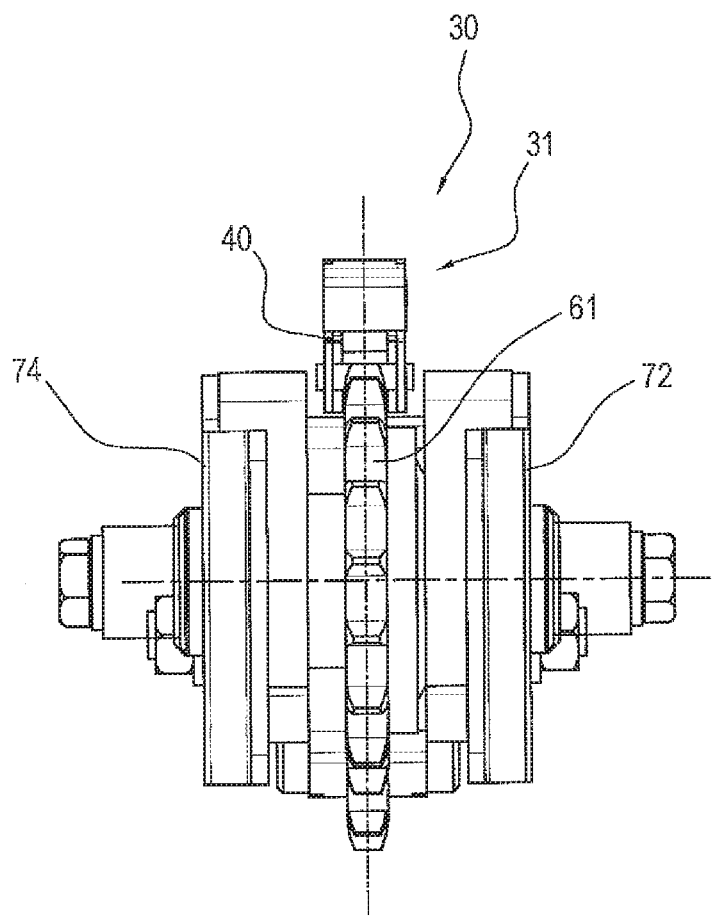
FIG. 4C is a front view of the preferred embodiment of a drive unit according to the invention.
Figure 4D:
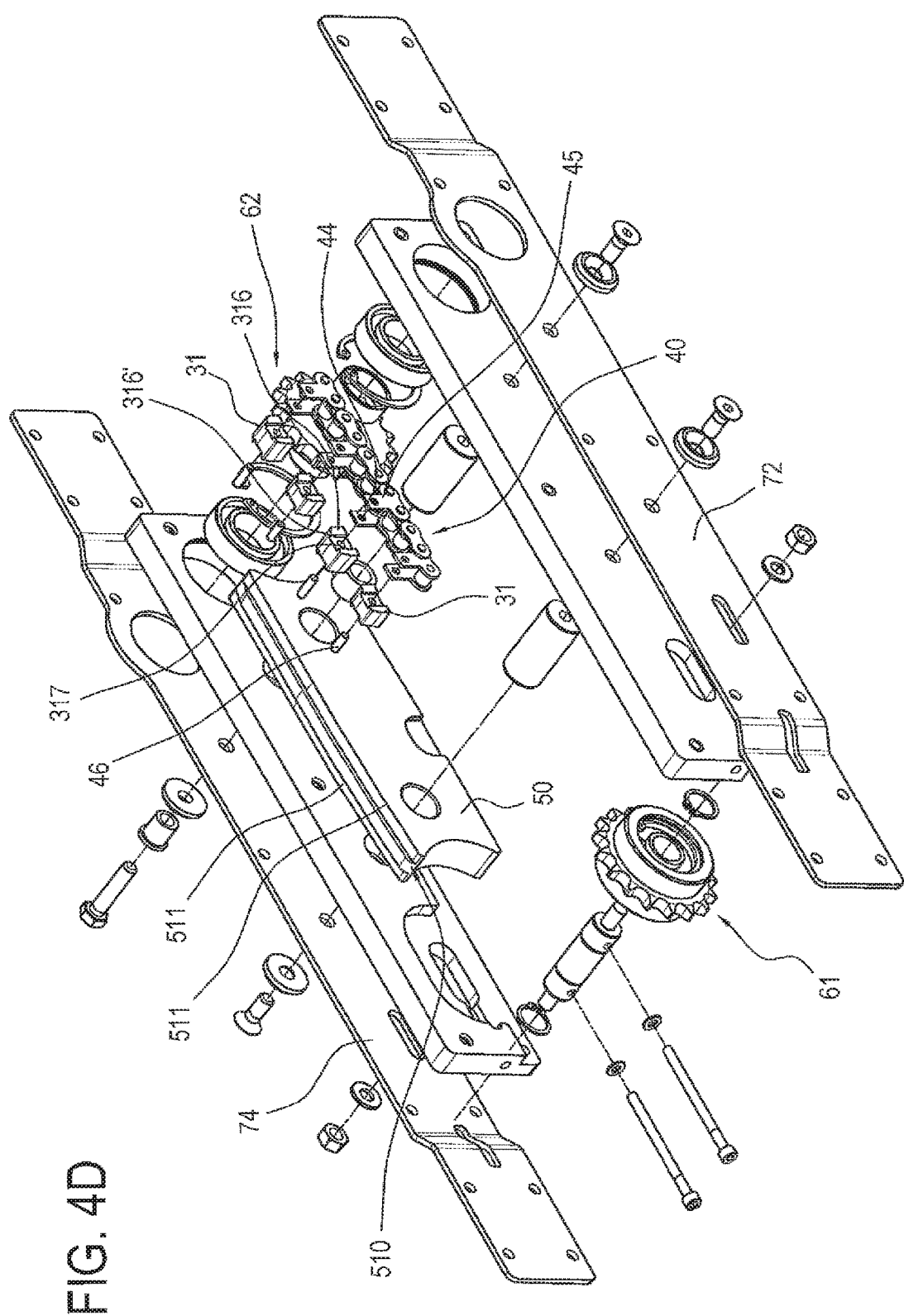
FIG. 4D is an exploded perspective view of the preferred embodiment of a drive unit according to the invention.

The accompanying drawings illustrate a preferred embodiment 10 of a conveyor for transporting a respective product.

The product preferably consists of respective articles.

More specifically, the articles are in the form of articles of the tissue industry, that is to say, they are in the form of articles made of paper or other material such as woven or non-woven fabric, and which are preferably in the form of rolls, packages, in particular, packs or packets, or in the form of respective containers, particularly for toilet paper, kitchen paper, napkins, handkerchiefs, face wipes, hand towels, bed sheets and the like, or other in the form of rolls of material for kitchen use such as aluminium foil, plastic wrap, greaseproof paper or the like.

As illustrated, the conveyor 10 comprises means 11 for supporting and guiding the endless conveyor belt 13, which is especially of the type whose links 12 are articulated, preferably by articulation means or pins 19 made preferably of a suitable rigid plastic material.

Although not illustrated in detail in the accompanying drawings, the conveyor belt has a positive stretch 13a, in particular for transporting the product, and preferably a return stretch 13b, which may be positioned under the transporting stretch, as may be inferred in particular from FIG. 1.

More specifically, the conveyor belt 13 might be like the one described in international patent application publication WO2012/001538 in the name of the same applicant as this invention.

More specifically, the conveyor belt comprises a link 12, which is made or die formed as a single part of plastic material and which is connected by corresponding articulation pins to the links adjacent to it, in particular, the link preceding it and the link following it.

More specifically, as may be inferred from FIG. 1, the supporting means comprise a plurality of profiles 11 which extend longitudinally and which slidably support the feed and return stretches 13a, 13b of the conveyor belt. The longitudinal profiles may be mounted on corresponding uprights not illustrated in detail in the accompanying drawings.

The longitudinal profiles 11' comprise, for each feed and return stretch, respective first and second sliding guides, not illustrated in detail in the accompanying drawings, and which are associated with, in particular fitted on corresponding opposite horizontal appendages of the profile and which are made of a suitable material, and constitute means for engaging the underside of the transversal supporting plate 14 of the link on the feed or forward stretch 13a of the belt and for the horizontal perpendicular retaining appendages 21a, 21b on the return stretch 13b of the belt. In practice, the guides are interposed between the transverse supporting plate 14 of the link and the perpendicular retaining appendages 21a, 21b.

As may be inferred from FIGS. 2A to 2E, each link 12 comprises an upper, product supporting portion 14 and a lower, connecting portion 16 by which it is articulated to the other conveyor links and which is made as one with the supporting portion 14 from which it extends perpendicularly.

The lower or articulation portion of the link also constitutes retaining and guide means, together with the supporting means 11 of the conveyor.

As may be inferred, the articulation portion 16 of the link 12 has a front central portion or core 18 for engaging a pin 19 which connects it to the preceding link and which extends into a corresponding transverse through hole 18' of the front connecting articulation or portion or core 18.

The central portion forms a core 18 with a substantially cylindrical outside profile and having a rear-facing surface 18a for engaging a respective tooth or element of the drive means of the conveyor belt, as will become clearer as this description continues.

The conveyor belt 13 moves preferably as illustrated, defining an upper forward feed stretch and a lower backward return stretch between two opposite ends where a drive wheel and a travel direction inversion wheel are respectively provided. It will be understood, however, that the conveyor of this invention might also be in the form of a conveyor belt which extends along a ring-shaped path consisting only of a positive or upper path of the conveyor belt, if necessary lying in the same plane.

As illustrated, extending rearwards from the core 18 of the bottom part of the link are two longitudinal appendages 20a, 20b for the connection and articulation of a pin 19 which connects the adjacent link 12 and which extends into corresponding transverse through holes 20'a, 20'b made in the vertical appendages 20a, 20b as well as in the core 18 of the link that follows, as may be easily inferred from FIG. 3A.

As illustrated, the longitudinal appendages 20a, 20b are transversely spaced from each other so as to receive in the space between them a corresponding front central portion or core 18 of the link which follows.

As illustrated, the product supporting portion 16 in turn comprises a corresponding horizontal plate 22 which extends transversely and laterally beyond both sides of the articulation portion 16, forming a wide surface 23 for supporting the product, and in particular, a flat surface. More specifically, the supporting surface 23 extends longitudinally between a front transverse edge 23a and a rear transverse edge 23b and transversely across opposite rectilinear flanks or lateral edges 23c, 23d.

As illustrated, the flanks or lateral edges 23c, 23d are parallel and longitudinal to the link.

The link 12 also has longitudinal protrusions at the front edge 23a and longitudinal protrusions at the rear edge 23b. These longitudinal protrusions are designed to be inserted into matching recesses on the adjacent links, that is to say, the link preceding and the link following, which comprise corresponding recesses at the rear edge 23b of the link and recesses at the front edge 23a of the same link.

In practice, as illustrated, behind the drive and articulation core 18 and between the longitudinal portions 20a and 20b and the respective underside surface 14' of the plate 22, each link has a respective cavity 25' into which the conveyor belt engagement and drive tooth or element of the drive means of the conveyor belt 13 is inserted, as will become clearer as this description continues.

The conveyor of the invention has corresponding means 30 for driving the conveyor belt 13 and which comprise corresponding means 31b adapted to engage the respective link 12 of the conveyor belt 13, in particular the respective articulation core 18, in particular by insertion into the cavity 25' at the back of the self-same core 18 of the link 12.

More specifically, the means 31 for engaging the respective link 12 of the conveyor belt 13 are adapted to engage a rear-facing surface 18a of the respective link 12 of the self-same conveyor belt 13.

The engagement means 31 are movable to produce the driving action which drives the conveyor belt 12.

Advantageously, the means 31 for engaging and driving the conveyor belt 13 are adapted to engage a respective longitudinal stretch, preferably rectilinear, of the conveyor belt 13 itself.

That way, it is possible to make means for driving the conveyor belt which can be located at any point on the respective longitudinal extension of the conveyor belt, if necessary at points which are at a certain longitudinal distance from each other, thus making it possible to make endless conveyor belts of desired length, in particular of particularly great length.

Advantageously, as may be inferred from the drawings, the means 31 for engaging and driving the conveyor belt 13 move translationally in a direction which is parallel, at least for a certain stretch, to the corresponding longitudinal stretch 13' of the conveyor belt 13.

Further advantageously, the means for engaging and driving the conveyor belt 13 comprise a plurality of tooth elements 31 for engaging corresponding surfaces 18a of respective links 12 of the conveyor belt 13, these elements or teeth 31 being adapted to engage a respective longitudinal stretch 13' of the conveyor belt itself.

This applies a particularly advantageous and effective engaging action on the conveyor belt.

Further advantageously, the means 31 for engaging and driving the conveyor belt 13 extend perpendicularly to the product transporting surface 14 of the conveyor belt 13 and, more specifically, extend vertically.

More specifically, the means for engaging and driving the conveyor belt 13 comprise a plurality of elements or teeth 31 for engaging corresponding surfaces of respective links 12 of the conveyor belt 13, these elements or teeth 31 being longitudinally spaced from each other, in particular by a quantity greater than, and more specifically, slightly greater than, the thickness or diameter of the respective articulation core 18.

These means, in particular the respective engagement element or tooth 31, are inserted into a corresponding cavity or space 25' defined between longitudinally adjacent links 12 of the conveyor belt 13, in particular between corresponding articulation cores 18 of the links 12.

Advantageously, the respective element or tooth for engaging the link of the conveyor belt is in the form of a respective pad or block 31 which, in particular, has a generally stubby shape.

Advantageously, the engagement pad or block 31 is made of plastic material, in particular rigid plastic material.

Advantageously, as may be inferred in particular from FIG. 3A, the respective engagement tooth or element 31 has a front face 311 for engaging and driving a corresponding rear-facing surface 18a, in particular of the articulation core 18 of the respective link 12 of the conveyor belt 13.

Advantageously, as illustrated, the front face 311 of the respective engagement tooth or element 31 has a front portion 311' for engaging the corresponding rear-facing surface 18a, in particular of the articulation core 18 of the respective link 12 of the conveyor belt 13, the front portion 311' extending planarly or substantially planarly and, in particular, when in the engaged condition, extending perpendicularly or substantially perpendicularly to the product transporting surface 14 of the conveyor belt, in particular extending vertically or substantially vertically.

Advantageously, the front face 311 of the respective engagement tooth or element 31 has a perpendicularly external portion 311", which is recessed, in particular inclinedly recessed relative to the front engagement portion 311' of the front face 311 to facilitate disengagement of the engagement element or tooth 31 of the conveyor belt link, that is to say, during the final stage of lowering to disengage the corresponding engagement element or tooth 31 relative to the respective conveyor belt link. As illustrated, the recessed portion 311" connects the front portion 311' to the longitudinal outside surface 315 of the self-same pad.

Advantageously, the respective engagement element or tooth 31 is longitudinally elongate, in particular by an amount substantially corresponding to the length of the receiving cavity or space 25' of the conveyor belt, that is to say, by an amount corresponding to the distance between two articulation cores 18, 18 of respective adjacent links 12, 12 of the conveyor belt.

This prevents the belt from excessive longitudinal sliding relative to the engagement elements or teeth 31, the conveyor belt thus remaining at all times in a condition which allows it to be optimally engaged and driven.

Advantageously, as illustrated, the respective engagement tooth or element 31 has a rear face 312 which, if necessary, can engage and drive the front face, in particular of the articulation core 18 of the next adjacent link 12 of the conveyor belt 13.

In particular, the rear face 312 of the respective engagement tooth or element 31 has a rear portion 312' which, if necessary, can engage the corresponding surface, in particular of the articulation core 18 of the respective next link of the conveyor belt, the rear portion extending planarly or substantially planarly and, in particular, when in the possibly engaged condition, extending perpendicularly or substantially perpendicularly to the product transporting surface 14 of the conveyor belt, in particular extending vertically or substantially vertically.

In particular, as illustrated, the rear face 312 of the respective engagement tooth or element 31 has a perpendicularly external portion 312", which is recessed, in particular inclinedly recessed relative to the rear portion 312' of possible engagement of the rear face 312 to facilitate insertion into and engagement with the cavity or space 25' of the conveyor belt. As illustrated, the recessed portion 312" connects the rear portion 312' to the longitudinal outside surface 315 of the self-same pad.

As illustrated, the rear face 312 of the respective engagement tooth or element 31 is shaped differently from the respective front face 311, in particular having a perpendicularly external portion 312", which is more inclined and longer than the corresponding portion 311" of the front face 311. In a different embodiment, however, the rear face 312 might imaginably be made like the corresponding front face 311 of the engagement element 31, thus achieving reversibility of motion to allow the conveyor belt to move effectively and optimally both forwards and backwards.

Advantageously, as illustrated, the respective engagement element or tooth 31 has opposite lateral faces 313, 314, where, in particular, there extend means or protrusions for fastening the engagement element 31 itself to corresponding movement means thereof.

Advantageously, the respective engagement element or tooth 31 has a respective perpendicularly external face 315, preferably planar, which in use is perpendicularly spaced from the corresponding underside face of the product transporting surface 14 of the conveyor belt, and which, moreover, allows waste to fall easily through the hole 71a made in the product supporting plate 22 of the link.

As illustrated, advantageously, the means for engaging and driving the conveyor belt 13 are supported and moved by a corresponding continuous elongate element 40 which is movable along a respective endless path.

Advantageously, the continuous elongate element 40 which supports the means for engaging and driving the conveyor belt 13 extends along a path which has a respective stretch, in particular a longitudinal stretch, this respective stretch 40' and/or 40" being adapted to engage and drive the belt.

More specifically, the continuous supporting element 40 extends along a path which has a stretch 40' which is adapted to engage and drive the conveyor belt at the product supporting stretch of the conveyor belt 13 itself.

Also, advantageously, the continuous supporting element 40 extends along a path which has a stretch 40" which is adapted to engage and drive the conveyor belt at the return stretch of the conveyor belt itself.

Thus, the driving action applied on both the upper positive stretch and on the lower return stretch creates an optimum drive system for the conveyor belt. The drive unit 30 might imaginably mesh only with the positive stretch of the conveyor belt or only with the return stretch, in particular the lower stretch, of the conveyor belt.

Advantageously, the respective drive stretch 40', 40" of the continuous supporting element 40 extends at least for a certain stretch in parallel with the path of the conveyor belt 13.

Advantageously, the continuous supporting element 40 extends along a path which has a stretch 401 for engaging and driving the belt, in particular upstream of the respective drive stretch 40', 40".

Advantageously, the stretch 401 for engaging and driving the belt, in particular upstream of the respective drive stretch 40', 40" consists of a stretch for feeding together with the conveyor belt 13 and simultaneously moving progressively closer to the self-same conveyor belt 13.

Advantageously, the continuous supporting element 40 extends along a path which has a stretch 402 for disengaging the drive of the conveyor belt 13, in particular downstream of the respective drive stretch 40', 40".

Advantageously, the stretch 402 for disengaging the drive of the belt, in particular downstream of the respective drive stretch 40', 40" consists of a stretch for feeding together with the conveyor belt 13 and simultaneously moving progressively away from the self-same conveyor belt 13.

Advantageously, the stretch 402 for disengaging the drive of the belt, in particular downstream of the respective drive stretch 40', 40" is longer than the corresponding engagement stretch 401 upstream of the drive stretch.

All of this produces an effective system for engaging and/or disengaging the means 31 for engaging and driving the conveyor belt.

Advantageously, as illustrated, the continuous supporting element is in the form of a chain 40 defined by respective links made up of respective longitudinal plates 410 connected by corresponding transverse articulation pins 411.

As illustrated, advantageously, the respective elements or teeth 31 for engaging the conveyor belt extend from links of the chain 40 which are spaced from each other by one or more links.

More specifically, the respective elements or teeth 31 for engaging the conveyor belt might not be present on the entire continuous element 40 and thus, in use, might be located on the positive stretch of the conveyor belt 13 or on the return stretch of the self-same conveyor belt 13.

Advantageously, the respective engagement element is connected to the continuous supporting element, in particular to the respective link of the chain 40, through corresponding fastening means 45 which extend perpendicularly from the continuous element itself.

More specifically, advantageously, the fastening means are in the form of corresponding perpendicularly protruding means 45, being in particular in the form of a first and a second opposite perpendicular protrusions 45, 45 to which a pin 46 is fixed which is inserted into a corresponding hole 317 of the engagement element 31.

The respective protrusion 45 which holds the fastening pin 46 is defined by a plate in the shape of an upturned T, whose wing is fixed to the pins of the chain links and whose core extends and defines the fastening means of the respective engagement element 31.

More specifically, as illustrated, the respective protrusion 45, 45 is inserted into a corresponding cavity, in particular perpendicular, 136 provided on the lateral surface of the engagement element 31 and does not therefore protrude transversely outside the transverse outline of the self-same element 31.

Advantageously provided are means 50 for guiding the path of the continuous supporting element 40 and/or means 31 for engaging and driving the conveyor belt 13, and which define, in particular, a longitudinal stretch 51', 51", preferably rectilinear or substantially rectilinear, for driving the conveyor belt and retainingly engaging the respective engagement element 31 with the conveyor belt 13, and/or a corresponding inclined stretch 52', 52" for engagement of the respective engagement element 31 with the conveyor belt 13, upstream of the longitudinal stretch, and/or an inclined stretch 53', 53" for disengagement, downstream of the respective inclined stretch.

Advantageously, the guide means 50 define first and second perpendicularly opposite longitudinal stretches 51', 51" for driving the conveyor belt, and retainingly engaging the respective engagement element 31 with the conveyor belt 13, in particular in the positive and return stretches thereof, and/or corresponding obliquely opposite inclined stretches 52', 52" for engagement of the respective engagement element 31 with the conveyor belt 13, and/or corresponding obliquely opposite inclined stretches 53', 53" for disengagement of the respective engagement element 31 from the conveyor belt.

Further advantageously, these guide means are defined by a single member 50, which is elongate and planar or plate-shaped and, in particular, which extends longitudinally and perpendicularly, that is, vertically.

More specifically, the guide means 50 are defined by a central profile 510 which protrudes between opposed lower planar surfaces 511, the central protruding profile 510 supporting the transverse pins of the links of the chain 40.

As illustrated, advantageously, the inclined stretch 53', 53" for disengaging and moving the respective engagement element 31 away from the conveyor belt 13, is substantially equal in length to the corresponding longitudinal drive stretch 51', 51".

Also, advantageously, the inclined stretch 52', 52" for engaging and moving the respective engagement element 31 away from the conveyor belt 13, is much shorter in length than the corresponding longitudinal drive stretch 51', 51" and/or the corresponding inclined disengagement stretch 53', 53".

Advantageously, the continuous supporting element 40 is driven on longitudinally opposite wheels 61, 62, in particular, toothed wheels, for meshing with the links of the chain 40, and in particular being in the form of a respective driving or drive wheel 61 and a driven wheel 62.

Further advantageously, the drive means 30 comprise respective supporting means 70, in particular having respective means 71 for connection to the conveyor supporting means, in particular in the form of respective fastening holes provided at the ends of respective supporting side panels 72, 74.

More specifically, the means 70 for supporting the drive means 30 comprise, as stated, opposite side panels 72, 74 which support corresponding bearing means for the drive wheels 61, 62.

Further, these supporting means support the means 50 for guiding the continuous element 40 and which, in particular, are provided between the opposite supporting side panels 72, 74.

The invention described is susceptible of industrial application. It would be obvious to one skilled in the art that several changes and modifications can be made to the invention without departing from the spirit and scope of the invention, described in depth above. Also, further preferred embodiments of the invention comprising one or more of the features described herein can easily be imagined. It will also be understood that all the details of the invention may be replaced by technically equivalent elements.

The invention claimed is:

1. A conveyor for transporting a product, comprising:
    an endless conveyor belt including a plurality of articulated links, each of the plurality of articulated links comprising a core including a rear-facing surface, with longitudinally adjacent ones of the plurality of articulated links defining a cavity between cores of the longitudinally adjacent ones of the plurality of articulated links, the plurality of articulated links establishing a product transporting surface, the endless conveyor belt including a product supporting stretch for transporting the product, and a return stretch;
    supporting surfaces for supporting and guiding the endless conveyor belt;
    a drive system for driving the endless conveyor belt, the drive system including at least one engagement tooth for engaging at least one of the rear-facing surfaces of the plurality of articulated links, the drive system engaging a longitudinal drive stretch of the endless conveyor belt,
    wherein the at least one engagement tooth includes a front face including a front portion for engaging and driving the rear-facing surface, and wherein, in a drive position, the at least one engagement tooth is positioned in the cavity between the cores of the longitudinally adjacent ones of the plurality of articulated links, with the front portion extending planarly and, when in an engaged condition with the rear-facing surface, extending perpendicularly and vertically to the product transporting surface, wherein the front face includes a perpendicularly external portion, which is inclined and recessed relative to the front portion to facilitate disengagement of the at least one engagement tooth.

2. The conveyor according to claim 1, wherein the at least one engagement tooth comprises a plurality of engagement teeth for engaging corresponding rear-facing surfaces of the plurality of articulated links.

3. The conveyor according to claim 1, wherein the at least one engagement tooth comprises a plurality of engagement teeth for engaging corresponding rear-facing surfaces of the plurality of articulated links, the plurality of engagement teeth being longitudinally spaced from each other by a distance greater than a thickness of a respective core.

4. The conveyor according to claim 1, wherein the at least one engagement tooth is formed as a pad having a height less than a lateral dimension.

5. The conveyor according to claim 1, wherein the at least one engagement tooth is longitudinally elongate by an amount corresponding to a length of the cavity.

6. The conveyor according to claim 5, wherein the at least one engagement tooth includes a rear face including a rear portion for engaging the core, the rear portion extending planarly and, when in the engaged condition, extending perpendicularly and vertically to the product transporting surface.

7. The conveyor according to claim 6, wherein the rear face includes an external portion which is inclined and recessed relative to the rear portion to facilitate insertion into and engagement with the cavity.

8. The conveyor according to claim 1, wherein the at least one engagement tooth includes a planar face, which in the engaged condition, is perpendicularly spaced from an underside face of the product transporting surface.

9. The conveyor according to claim 1, wherein the drive system includes a continuous elongate element movable along a respective endless path, the continuous elongate element connected to the at least one engagement tooth for supporting and moving the at least one engagement tooth.

10. The conveyor according to claim 9, wherein the continuous elongate element extends along a path which includes a longitudinal stretch for engaging and driving the endless conveyor belt.

11. The conveyor according to claim 9, wherein the continuous elongate element extends along a path which includes a stretch for engaging and driving the endless conveyor belt at the product supporting stretch.

12. The conveyor according to claim 9, wherein the continuous elongate element extends along a path which includes a stretch for engaging and driving the endless conveyor belt at the return stretch.

13. The conveyor according to claim 9, wherein the continuous elongate element extends along a path which includes a drive stretch and a converging stretch upstream of the drive stretch, where the converging stretch includes a stretch for feeding together with the endless conveyor belt and simultaneously moving progressively closer to the endless conveyor belt.

14. The conveyor according to claim 9, wherein the continuous elongate element extends along a path which includes a drive stretch and a disengagement stretch downstream of the drive stretch, where the disengagement stretch includes a stretch for feeding together with the endless conveyor belt and simultaneously moving progressively away from the endless conveyor belt.

15. The conveyor according to claim 14, wherein the disengagement stretch is longer than the drive stretch.

16. The conveyor according to claim 9, wherein the continuous elongate element comprises a chain including links made up of longitudinal plates connected by transverse articulation pins.

17. The conveyor according to claim 16, and further comprising a fastener connecting the at least one engagement tooth to the continuous elongate element, wherein the fastener extends perpendicularly to the continuous elongate element.

18. The conveyor according to claim 17, wherein the continuous elongate element comprises opposite lateral faces including protrusions, and the fastener connects the at least one engagement tooth to the protrusions.

19. The conveyor according to claim 17, wherein the continuous elongate element includes perpendicularly extending first and second protrusions on opposite sides of the continuous elongate element and a pin extending through a hole of the at least one engagement tooth and connecting to the first and second protrusions, and wherein each of the first and second protrusions includes a plate fixed to the transverse articulation pins.

20. The conveyor according to claim 1, wherein the rear-facing surface is convex.

* * * * *